US012150487B2

(12) United States Patent
Cho et al.

(10) Patent No.: US 12,150,487 B2
(45) Date of Patent: Nov. 26, 2024

(54) AEROSOL GENERATING DEVICE AND OPERATION METHOD THEREOF

(71) Applicant: KT&G CORPORATION, Daejeon (KR)

(72) Inventors: Byung Sung Cho, Gwangmyeong-si (KR); Won Kyeong Lee, Guri-si (KR); Jong Sub Lee, Seongnam-si (KR); Dae Nam Han, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 433 days.

(21) Appl. No.: 16/982,345

(22) PCT Filed: Apr. 28, 2020

(86) PCT No.: PCT/KR2020/005571
§ 371 (c)(1),
(2) Date: Sep. 18, 2020

(87) PCT Pub. No.: WO2020/222497
PCT Pub. Date: Nov. 5, 2020

(65) Prior Publication Data

US 2022/0039480 A1 Feb. 10, 2022

(30) Foreign Application Priority Data

Apr. 30, 2019 (KR) ........................ 10-2019-0050403
May 9, 2019 (KR) ........................ 10-2019-0054518

(51) Int. Cl.
*A24F 40/57* (2020.01)
*A24F 40/10* (2020.01)
(Continued)

(52) U.S. Cl.
CPC .............. *A24F 40/57* (2020.01); *A24F 40/10* (2020.01); *A24F 40/51* (2020.01); *H05B 1/02* (2013.01)

(58) Field of Classification Search
CPC .......... A24F 40/57; A24F 40/10; A24F 40/51; A24F 40/40; A24F 40/50; A24F 40/46; H05B 1/02; H05B 6/06; H05B 6/108
See application file for complete search history.

(56) References Cited

U.S. PATENT DOCUMENTS 4,441,331 A 4/1984 Yuyama
9,532,600 B2 1/2017 Thorens et al.
(Continued)

FOREIGN PATENT DOCUMENTS

CN 108783595 A 11/2018
CN 109349690 A 2/2019
(Continued)

OTHER PUBLICATIONS

International Search Report [PCT/ISA/210] of PCT/KR2020/005571 dated Sep. 3, 2020.
(Continued)

*Primary Examiner* — Travis S Chambers
(74) *Attorney, Agent, or Firm* — Sughrue Mion, PLLC

(57) ABSTRACT

Disclosed are an aerosol generating device including a heater that heats an aerosol generating material; a battery that supplies power to the heater; a sensor that senses puffs of aerosol; and a controller that determine a power profile based on a time interval between the puffs of the user and controls power to be supplied to the heater according to the determined power profile, and an operation method thereof.

11 Claims, 5 Drawing Sheets

(51) Int. Cl.

| | |
|---|---|
| ***A24F 40/51*** | (2020.01) |
| ***H05B 1/02*** | (2006.01) |

(56) References Cited

U.S. PATENT DOCUMENTS

| | | | | |
|---|---|---|---|---|
| 10,238,143 | B2 | 3/2019 | Capuano | |
| 10,716,329 | B2 | 7/2020 | Matsumoto et al. | |
| 2013/0319440 | A1 | 12/2013 | Capuano | |
| 2014/0270727 | A1 | 9/2014 | Ampolini et al. | |
| 2015/0257445 | A1 | 9/2015 | Henry, Jr. et al. | |
| 2016/0309784 | A1 | 10/2016 | Silvestrini et al. | |
| 2019/0133192 | A1 | 5/2019 | Lord et al. | |
| 2019/0216136 | A1* | 7/2019 | Capuano | A24F 40/50 |
| 2019/0223512 | A1 | 7/2019 | Nakano et al. | |
| 2020/0237014 | A1 | 7/2020 | Lee et al. | |
| 2021/0289845 | A1* | 9/2021 | Silvestrini | A24F 40/46 |
| 2022/0095692 | A1* | 3/2022 | Ferrie | A24F 40/57 |

FOREIGN PATENT DOCUMENTS

| | | | |
|---|---|---|---|
| CN | 109788798 | A | 5/2019 |
| EP | 2460423 | A1 | 6/2012 |
| EP | 2797447 | A2 | 11/2014 |
| JP | 2014-504886 | A | 2/2014 |
| JP | 2017-509339 | A | 4/2017 |
| KR | 10-2015-0130458 | A | 11/2015 |
| KR | 10-2016-0058132 | A | 5/2016 |
| KR | 10-2016-0098212 | A | 8/2016 |
| KR | 10-2018-0070443 | A | 6/2018 |
| KR | 10-1922737 | B1 | 11/2018 |
| KR | 10-1939033 | B1 | 1/2019 |
| WO | 2012/109371 | A2 | 8/2012 |

OTHER PUBLICATIONS

Written Opinion [PCT/ISA/237] of PCT/KR2020/005571 dated Sep. 3, 2020.

Office Action issued Feb. 14, 2023 in Chinese Application No. 202080001853.0.

Notice of Reasons for Refusal dated Oct. 5, 2021 from the Japanese Patent Office in Japanese Application No. 2020-560187.

Extended European Search Report dated Jan. 4, 2022 from the European Patent Office in EP Application No. 20768492.9.

* cited by examiner

[Fig. 1]
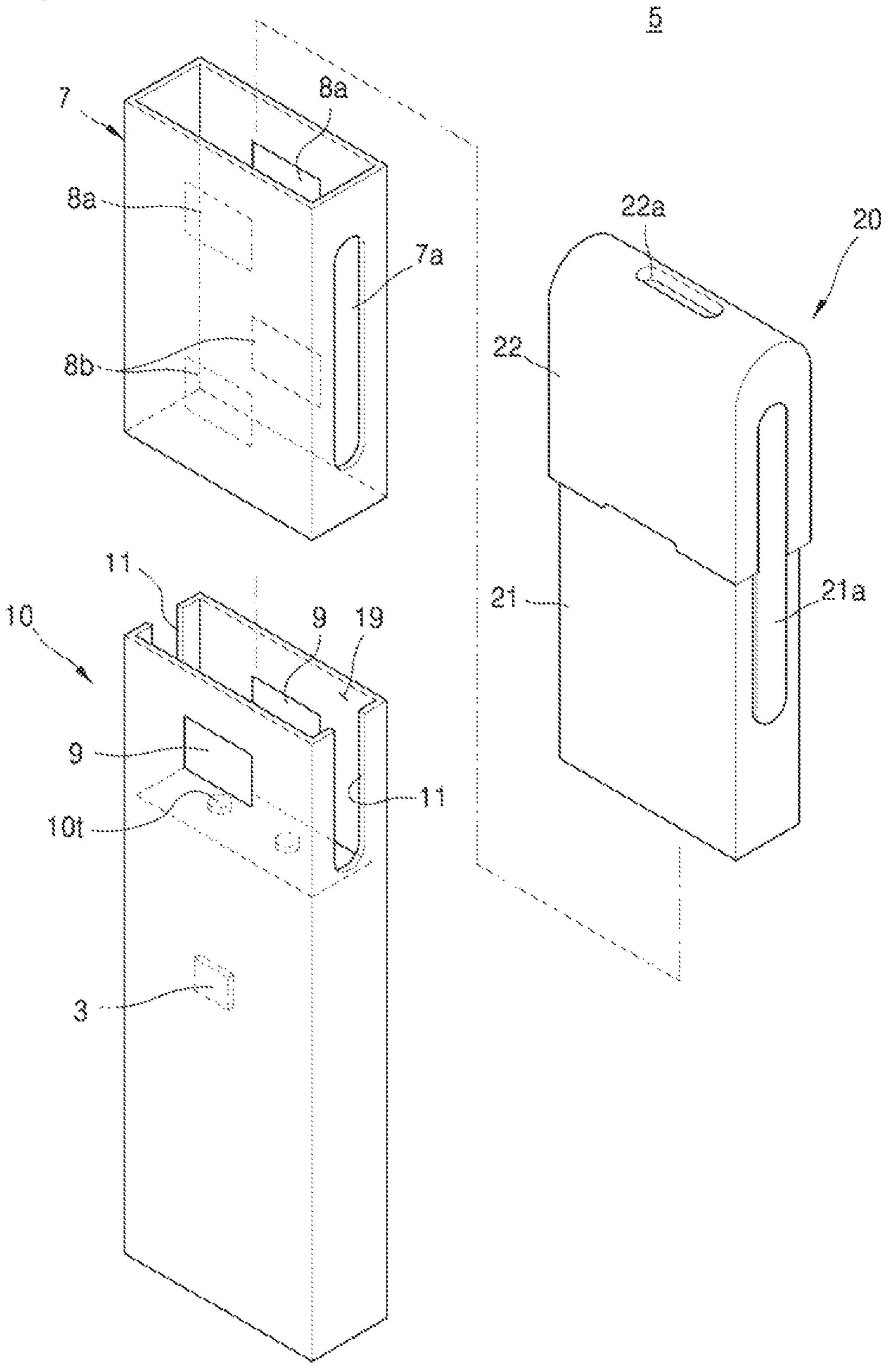

[Fig. 2]
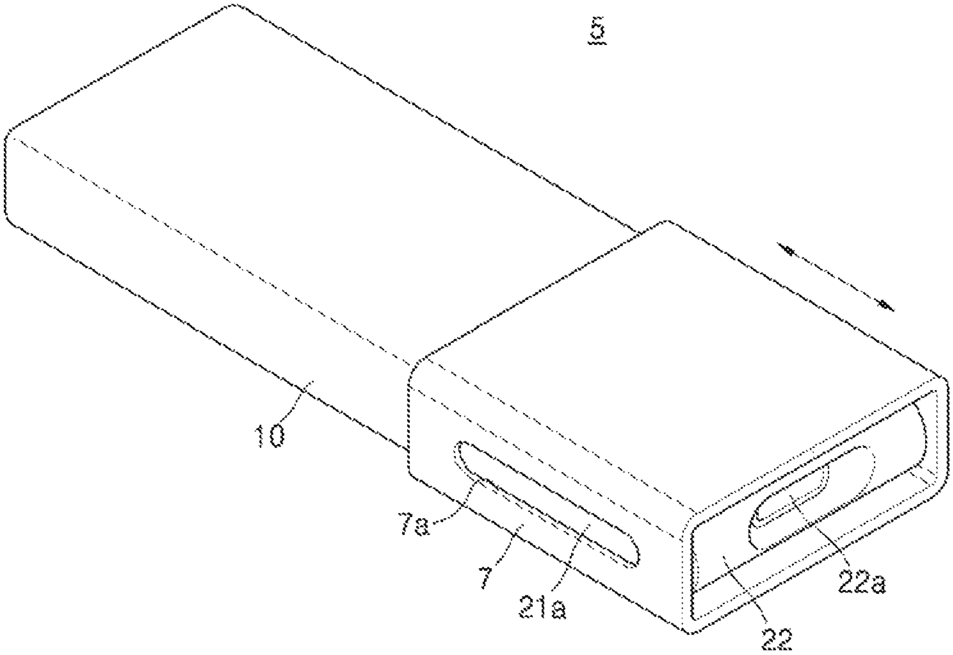
[Fig. 3]
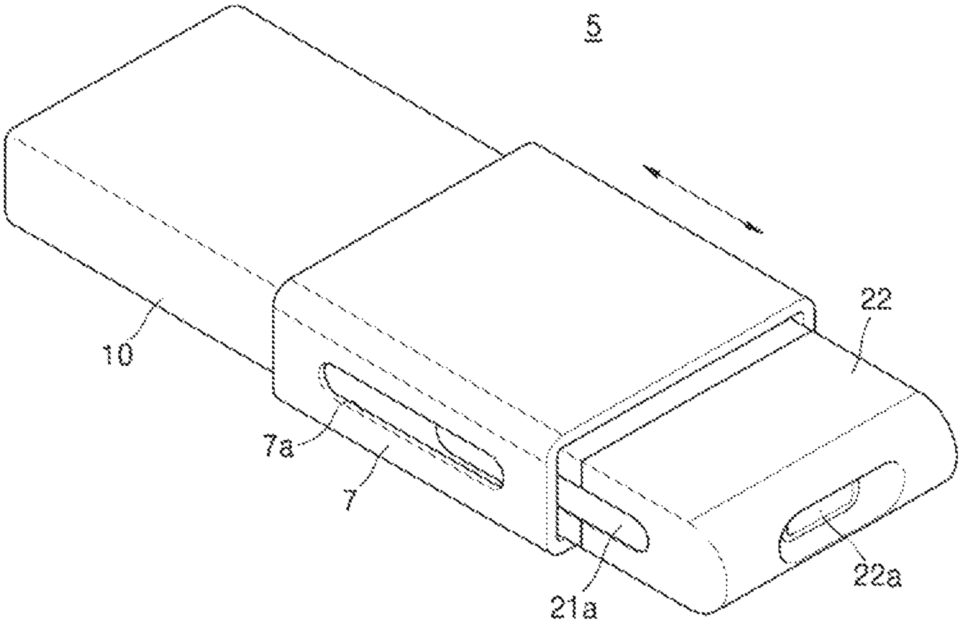

[Fig. 4]
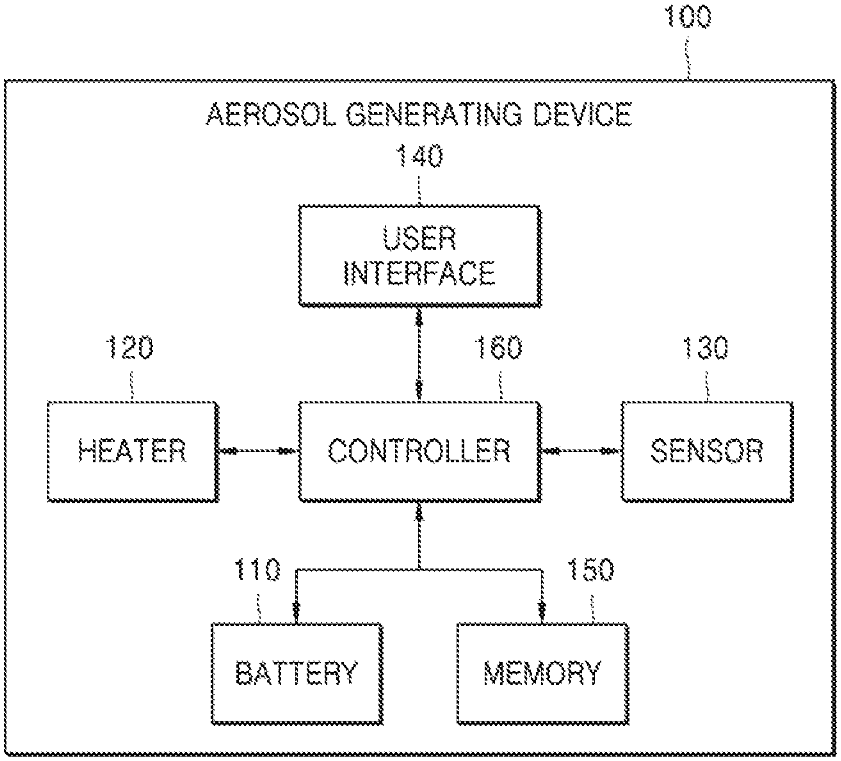
[Fig. 5]
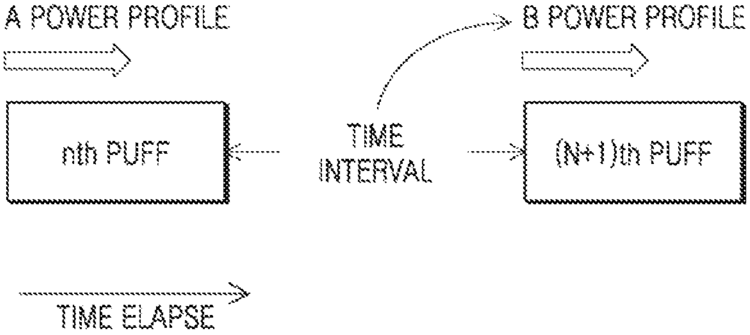
[Fig. 6]
610
| PUFF TIME INTERVAL | POWER PROFILE |
|---|---|
| 0 TO 3 SECONDS | FIRST POWER PROFILE (1W) |
| 3 TO 6 SECONDS | SECOND POWER PROFILE (2W) |
| 6 TO 9 SECONDS | THIRD POWER PROFILE (4W) |
| . . . | |

[Fig. 7]
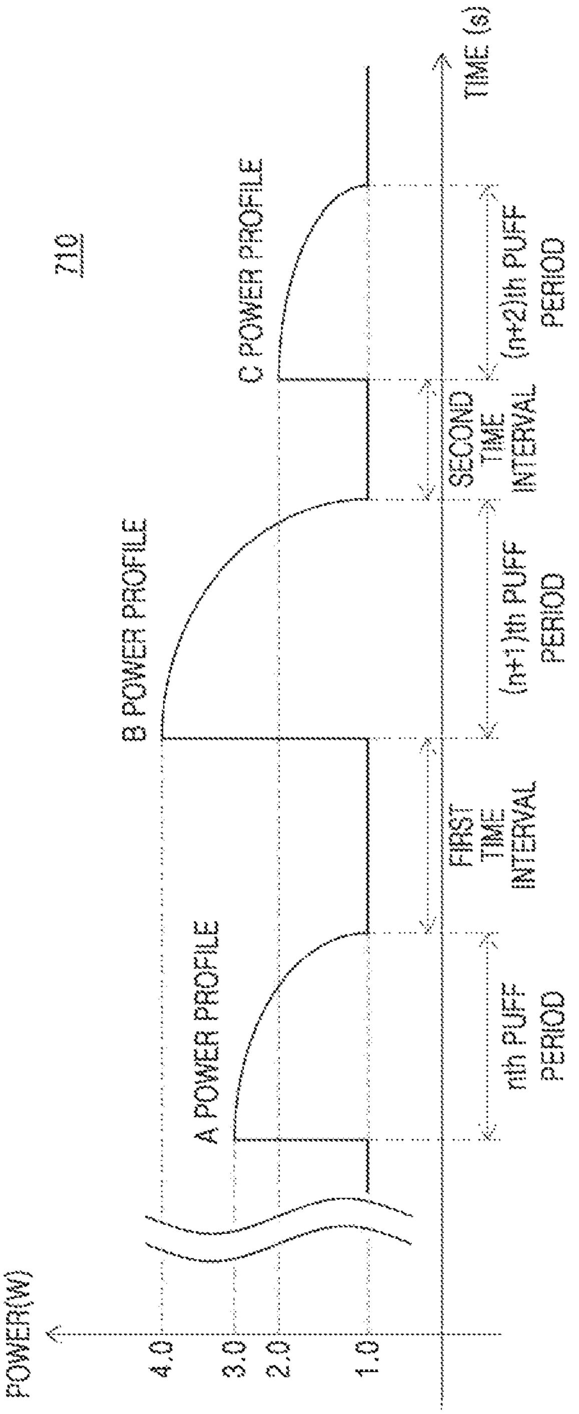

[Fig. 8]
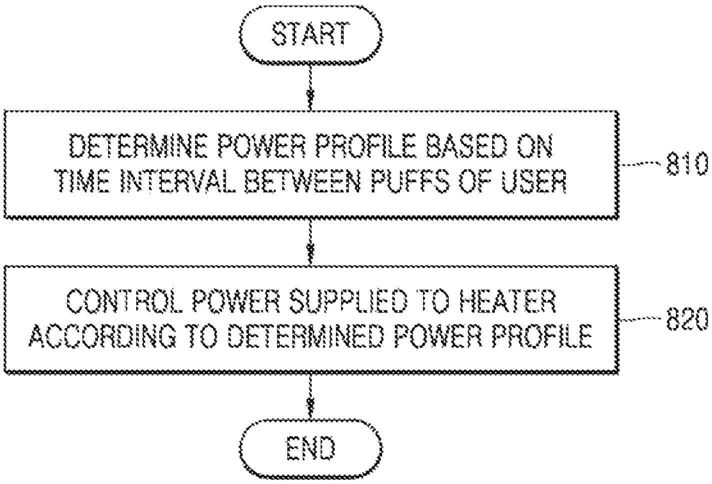

AEROSOL GENERATING DEVICE AND OPERATION METHOD THEREOF

CROSS REFERENCE TO RELATED APPLICATIONS

This is a National Stage of International Application No. PCT/KR2020/005571 filed Apr. 28, 2020, claiming priority based on Korean Patent Application No. 10-2019-0050403 filed Apr. 30, 2019 and Korean Patent Application No. 10-2019-0054518 filed on May 9, 2019.

TECHNICAL FIELD

The present disclosure relates to an aerosol generating device and an operation method thereof.

BACKGROUND ART

In recent years, demands for an alternative to traditional combustive cigarettes have been increased. For example, there is growing demand for an aerosol generating device that generates aerosol by heating an aerosol generating material, rather than by combusting cigarettes.

Accordingly, in order to effectively heat an aerosol generating material, there is a need for technology for controlling power supplied to a heater.

DISCLOSURE OF INVENTION

Solution to Problem

The present disclosure provides an aerosol generating device that controls power supplied to a heater and an operation method thereof.

According to an embodiment, there may be provided an aerosol generating device including a heater that heats an aerosol generating material; a battery that supplies power to the heater; a sensor that senses puffs of aerosol; and a controller that determine a power profile based on a time interval between the puffs and controls power to be supplied to the heater according to the determined power profile.

Advantageous Effects of Invention

According to the present disclosure, a power profile may be determined based on a time interval between user's puffs, and power supplied to a heater is controlled according to the determined power profile, and thus, variation in atomization amount may be reduced and a heater may be prevented from being carbonized.

BRIEF DESCRIPTION OF DRAWINGS

FIG. 1 is an exploded perspective view schematically illustrating a coupling relationship between a replaceable cartridge containing an aerosol generating material and an aerosol generating device including the same, according to an embodiment.

FIG. 2 is a perspective view of an example operation state of the aerosol generating device according to the embodiment illustrated in FIG. 1.

FIG. 3 is a perspective view of another example operation state of the aerosol generating device according to the embodiment illustrated in FIG. 1.

FIG. 4 is a block diagram illustrating hardware configuration elements of an aerosol generating device according to an embodiment.

FIG. 5 illustrates that the aerosol generating device determines a power profile, according an embodiment.

FIG. 6 illustrates information on a correspondence relationship between power profiles and time intervals between puffs.

FIG. 7 illustrates a graph 710 showing a level of power supplied to a heater, according to an embodiment.

FIG. 8 is a flowchart illustrating a method of controlling power of an aerosol generating device.

BEST MODE FOR CARRYING OUT THE INVENTION

According to an aspect of the present disclosure, there may be provided an aerosol generating device including a heater that heats an aerosol generating material; a battery that supplies power to the heater; a sensor that senses puffs of aerosol; and a controller that determines a power profile based on a time interval between the puffs and controls power supplied to the heater according to the determined power profile.

In addition, the controller may detect an end time of an n-th puff and a start time of an (n+1)th puff and determines a power profile for the (n+1)th puff based on a time interval between the start time and the end time, where n is a natural number.

In addition, the controller may compare a first time interval between an n-th puff and an (n+1)th puff, with a second time interval between the (n+1)th puff and an (n+2)th puff, and based on the second time interval being longer than the first time interval, the controller determines a power profile for the (n+2)th puff such that higher power is supplied to the heater during the (n+2)th puff than during the (n+1)th puff, and based on the second time interval being shorter than the first time interval, the controller determines the power profile for the (n+2)th puff such that lower power is provided to the heater during the (n+2)th puff than during the (n+1)th puff, where n is a natural number.

In addition, the controller may determine the power profile by comparing the time interval between the puffs with a predetermined reference time.

In addition, based on a first time interval between an n-th puff and an (n+1)th puff being shorter than the reference time, the controller may determine a power profile for the (n+1)th puff such that lower power is provided to the heater during the (n+1)th puff than during the n-th puff, where n is a natural number.

In addition, based on a first time interval between an n-th puff and an (n+1)th puff being shorter than the reference time, the controller may determine a power profile for the (n+1)th puff such that a predetermined level of power is maintained during the (n+1)th puff.

In addition, based on a first time interval between an n-th puff and an (n+1)th puff being longer than the reference time, the controller may determine a power profile for the (n+1)th puff such that higher power is provided to the heater during the (n+1)th puff than during the n-th puff, where n is a natural number.

In addition, the aerosol generating device may further include a memory that stores information on a correspondence relationship between the time interval between the puffs and the power profile, and the controller may determine the power profile based on the time interval between the puffs, according to the information.

In addition, the aerosol generating material may be a liquid composition.

According to another aspect of the present disclosure, there may be provided a main body that may be coupled to a cartridge including an aerosol generating material and a heater for heating the aerosol generating material and that includes a battery that supplies power to the heater, a sensor that senses puffs of aerosol; and a controller that determines a power profile based on a time interval between the puffs and controls power supplied to the heater according to the determined power profile.

According to another aspect of the present disclosure, there may be provided method of operating an aerosol generating device, including: determining a power profile based on a time interval between puffs of aerosol; and controlling power supplied to the heater according to the determined power profile.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which example embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 containing the aerosol generating material may be coupled to the main body 10. A portion of the cartridge 20 may be inserted into an accommodation space 19 of the main body 10 so that the cartridge 20 may be mounted on the main body 10.

The cartridge 20 may contain an aerosol generating material in at least one of a liquid state, a solid state, a gaseous state, and a gel state. The aerosol generating material may include a liquid composition. For example, the liquid composition may be a liquid including a tobacco-containing material having a volatile tobacco flavor component, or a liquid including a non-tobacco material.

For example, the liquid composition may include one component of water, solvents, ethanol, plant extracts, spices, flavorings, and vitamin mixtures, or a mixture of these components. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for the formation of the nicotine salts may be appropriately selected in consideration of the rate of nicotine absorption in the blood, the operating temperature of the aerosol generating device 5, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, and malic acid, or may be a mixture of two or more acids selected from the above-described group, but is not limited thereto.

The cartridge 20 may be operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, in response to receiving the electrical signal from the main body 10, the cartridge 20 may convert the phase of the aerosol generating material by heating the aerosol generating material, using, for example, an ultrasonic vibration method or an induction heating method. In an embodiment, the cartridge 20 may include its own power source and generate aerosol based on an electric control signal or a wireless signal received from the main body 10.

The cartridge 20 may include a liquid storage 21 accommodating the aerosol generating material therein, and an atomizer performing a function of converting the aerosol generating material of the liquid storage 21 to aerosol.

When the liquid storage 21 "accommodates the aerosol generating material" therein, it means that the liquid storage 21 functions as a container simply holding an aerosol generating material. The liquid storage 21 may include an element i.e., containing an aerosol generating material, such as a sponge, cotton, fabric, or porous ceramic structure.

The atomizer may include, for example, a liquid delivery element (e.g., a wick) for absorbing the aerosol generating material and maintaining the same in an optimal state for conversion to aerosol, and a heater heating the liquid delivery element to generate aerosol.

The liquid delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like. Also, the heater may be implemented by a conductive filament using a material such as a nichrome wire, and may be wound around or arranged adjacent to the liquid delivery element.

In addition, the atomizer may be implemented by a heating element in the form of a mesh or plate, which absorbs the aerosol generating material and maintains the same in an optimal state for conversion to aerosol, and generates aerosol by heating the aerosol generating material. In this case, a separate liquid delivery element may not be required.

At least a portion of the liquid storage 21 of the cartridge 20 may include a transparent portion so that the aerosol generating material accommodated in the cartridge 20 may be visually identified from the outside. The liquid storage 21 may include a protruding window 21*a* protruding from the liquid storage 21, so that the liquid storage 21 may be inserted into a groove 11 of the main body 10 when coupled to the main body 10. A mouthpiece 22 and/or the liquid storage 21 may be entirely formed of transparent plastic or glass. Alternatively, only the protruding window 21*a* may be formed of a transparent material.

The main body 10 includes a connection terminal 10*t* arranged inside the accommodation space 19. When the liquid storage 21 of the cartridge 20 is inserted into the accommodation space 19 of the main body 10, the main body 10 may provide power to the cartridge 20 or supply a signal related to an operation of the cartridge 20 to the cartridge 20, through the connection terminal 10*t*.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22*a* for discharging aerosol generated from the aerosol generating material inside the liquid storage 21 to the outside.

The slider 7 is coupled to the main body 10 to move with respect to the main body 10. The slider 7 covers or exposes at least a portion of the mouthpiece 22 of the cartridge 20 coupled to the main body 10 by moving with respect to the main body 10. The slider 7 includes an elongated hole 7*a* exposing at least a portion of the protruding window 21*a* of the cartridge 20 to the outside.

As shown FIG. 1, the slider 7 may have a shape of a hollow container with both ends opened, but the structure of the slider 7 is not limited thereto. For example, the slider 7 may have a bent plate structure having a clip-shaped cross-section, which is movable with respect to the main body 10 while being coupled to an edge of the main body 10. In another example, the slider 7 may have a curved semi-cylindrical shape with a curved arc-shaped cross section.

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies 8*a* facing each other, and two second magnetic bodies 8*b* facing each other. The first magnetic bodies 8*a* are arranged to be spaced apart from the second magnetic bodies 8*b* in a longitudinal direction of the main body 10 (i.e., the direction in which the main body 10 extends), which is a moving direction of the slider 7.

The main body 10 includes a fixed magnetic body 9 arranged on a path along which the first magnetic bodies 8*a* and the second magnetic bodies 8*b* of the slider 7 move as the slider 7 moves with respect to the main body 10. Two fixed magnetic bodies 9 of the main body 10 may be mounted to face each other with the accommodation space 19 therebetween.

The slider 7 may be stably maintained in positions where an end of the mouthpiece 22 is covered or exposed, by magnetic force acting between the fixed magnetic body 9 and the first magnetic body 8*a* or between the fixed magnetic body 9 and the second magnetic body 8*b*.

The main body 10 includes a position change detecting sensor 3 arranged on the path along which the first magnetic body 8*a* and the second magnetic body 8*b* of the slider 7 move as the slider 7 moves with respect to the main body 10. The position change detecting sensor 3 may include, for example, a Hall integrated circuit (IC) that uses the Hall effect to detect a change in a magnetic field, and may generate a signal based on the detected change.

In the aerosol generating device 5 according to the above-described embodiments, the main body 10, the cartridge 20, and the slider 7 have approximately rectangular cross-sectional shapes when viewed in the longitudinal direction, but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly, and may be curved in a streamlined shape or bent at a preset angle to be easily held by the user.

FIG. 2 is a perspective view of an example operating state of the aerosol generating device according to the embodiment illustrated in FIG. 1.

In FIG. 2, the slider 7 is moved to a position where the end of the mouthpiece 22 of the cartridge coupled to the main body 10 is covered. In this state, the mouthpiece 22 may be safely protected from external impurities and kept clean.

The user may check the remaining amount of aerosol generating material contained in the cartridge by visually checking the protruding window 21*a* of the cartridge through the elongated hole 7*a* of the slider 7. The user may move the slider 7 in the longitudinal direction of the main body 10 to use the aerosol generating device 5.

FIG. 3 is a perspective view of another example operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In this state, the user may insert the mouthpiece 22 into his or her mouth and inhale aerosol discharged through the discharge hole 22*a* of the mouthpiece 22.

As shown in FIG. 3, the protruding window 21*a* of the cartridge is still exposed to the outside through the elongated hole 7*a* of the slider 7 when the slider 7 is moved to the position where the end of the mouthpiece 22 is exposed to the outside. Thus, the user may be able to visually check the remaining amount of aerosol generating material contained in the cartridge, regardless of the position of the slider 7.

FIG. 4 is a block diagram illustrating components of the aerosol generating device according to an embodiment.

Referring to FIG. 4, the aerosol generating device 100 may include a battery 110, a heater 120, a sensor 130, a user interface 140, a memory 150, and a controller 160. However, the internal structure of the aerosol generating device 100 is not limited to the structures illustrated in FIG. 4. Also, it will be understood by one of ordinary skill in the art that some of the hardware components shown in FIG. 4 may be omitted or new components may be added according to the design of the aerosol generating device 100.

In an embodiment where the aerosol generating device 100 includes a main body without a cartridge, the components shown in FIG. 4 may be located in the main body. In another embodiment where the aerosol generating device 100 includes a main body and a cartridge, the components shown in FIG. 4 may be located in the main body and/or the cartridge.

The battery 110 supplies electric power to be used for the aerosol generating device 100 to operate. For example, the battery 110 may supply power such that the heater 120 may be heated. In addition, the battery 110 may supply power required for operation of other components of the aerosol generating device 100, such as the sensor 130, the user interface 140, the memory 150, and the controller 160. The battery 110 may be a rechargeable battery or a disposable battery. For example, the battery 110 may be a lithium polymer (LiPoly) battery, but is not limited thereto.

The heater 120 receives power from the battery 110 under the control of the controller 160. The heater 120 may receive power from the battery 110 and heat a cigarette inserted into the aerosol generating device 100, or heat the cartridge mounted on the aerosol generating device 100.

The heater 120 may be located in the main body of the aerosol generating device 100. Alternatively, the heater 120 may be located in the cartridge. When the heater 120 is located in the cartridge, the heater 120 may receive power from the battery 110 located in the main body and/or the cartridge.

The heater 120 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 120 may be implemented by a metal wire, a metal plate on which an electrically conductive track is arranged, or a ceramic heating element, but is not limited thereto.

In an embodiment, the heater 120 may be included in the cartridge. The cartridge may include the heater 120, the liquid delivery element, and the liquid storage. The aerosol generating material accommodated in the liquid storage may be absorbed by the liquid delivery element, and the heater 120 may heat the aerosol generating material absorbed by the liquid delivery element, thereby generating aerosol. For example, the heater 120 may include a material such as nickel or chromium and may be wound around or arranged adjacent to the liquid delivery element.

In another embodiment, the heater 120 may heat the cigarette inserted into the accommodation space of the aerosol generating device 100. As the cigarette is accommodated in the accommodation space of the aerosol generating device 100, the heater 120 may be located inside and/or outside the cigarette. Accordingly, the heater 120 may generate aerosol by heating the aerosol generating material in the cigarette.

Meanwhile, the heater 120 may include an induction heater. The heater 120 may include an electrically conductive coil for heating a cigarette or the cartridge by an induction heating method, and the cigarette or the cartridge may include a susceptor which may be heated by the induction heater.

The aerosol generating device 100 may include at least one sensor 130. A result sensed by the at least one sensor 130 is transmitted to the controller 160, and the controller 160 may control the aerosol generating device 100 by controlling the operation of the heater, restricting smoking, determining whether a cigarette (or a cartridge) is inserted, displaying a notification, etc.

For example, the sensor 130 may include a puff detecting sensor. The puff detecting sensor may detect a user's puff based on a temperature change, a flow change, a voltage change, and/or a pressure change.

In addition, the at least one sensor 130 may include a temperature sensor. The temperature sensor may detect a temperature of the heater 120 (or an aerosol generating material). The aerosol generating device 100 may include a separate temperature sensor for sensing a temperature of the heater 120, or the heater 120 itself may serve as a temperature sensor without a separate temperature sensor. Alternatively, an additional temperature sensor may be further included in the aerosol generating device 100 while the heater 120 may serve as a temperature sensor.

The sensor 130 may include a position change detecting sensor. The position change detecting sensor may detect a change in a position of the slider which is coupled to the main body and slides along the main body.

The user interface 140 may provide the user with information about the state of the aerosol generating device 100. For example, the user interface 140 may include various interfacing devices, such as a display or a light emitter for outputting visual information, a motor for outputting haptic information, a speaker for outputting sound information, input/output (I/O) interfacing devices (for example, a button or a touch screen) for receiving information input from the user or outputting information to the user, terminals for performing data communication or receiving charging power, and/or communication interfacing modules for performing wireless communication (for example, Wi-Fi, Wi-Fi direct, Bluetooth, near-field communication (NFC), etc.) with external devices.

The memory 150 may store various data processed or to be processed by the controller 160. The memory 150 may include various types of memories, such as dynamic random access memory (DRAM), static random access memory (SRAM), read-only memory (ROM), electrically erasable programmable read-only memory (EEPROM), etc.

For example, the memory 150 may store an operation time of the aerosol generating device 100, the maximum number of puffs, the current number of puffs, at least one temperature profile, data on a user's smoking pattern, etc.

The controller 160 may control overall operations of the aerosol generating device 100. The controller 160 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The controller 160 analyzes a result of the sensing by at least one sensor 130, and controls processes that are to be performed subsequently.

The controller 160 may control power supplied to the heater 120 so that the operation of the heater 120 is started or terminated, based on the result of the sensing by the sensor 130. In addition, based on the result of the sensing by the sensor 130, the controller 160 may control the amount of power supplied to the heater 120 and the time at which the power is supplied, so that the heater 120 is heated to a predetermined temperature or maintained at an appropriate temperature.

In an embodiment, the controller 160 may set a mode of the heater 120 to a pre-heating mode to start the operation of the heater 120 after receiving a user input to the aerosol generating device 100. In addition, the controller 160 may switch the mode of the heater 120 from the pre-heating mode to an operation mode after detecting a user's puff by using the puff detecting sensor. In addition, the controller 160 may stop supplying power to the heater 120 when the number of puffs reaches a preset number after counting the number of puffs by using the puff detecting sensor.

The controller 160 may control the user interface 140 based on the result of the sensing by the at least one sensor 130. For example, when the number of puffs counted by the puff detecting sensor reaches a preset number, the controller 160 may notify the user by using the user interface 140 (e.g., a light emitter, a motor, a speaker, etc.) that the aerosol generating device 100 will soon be terminated.

Although not illustrated in FIG. 4, the aerosol generating device 100 may be combined with a separate cradle to form an aerosol generating system. For example, the cradle may be used to charge the battery 110 of the aerosol generating device 100. For example, the aerosol generating device 100 may be supplied with power from a battery of the cradle to charge the battery 110 of the aerosol generating device 100 while being accommodated in an accommodation space of the cradle.

The controller 160 may determine a power profile based on a time interval between user's puffs and control power to be supplied to the heater 120 according to the determined power profile. Specifically, the controller 160 may determine a power profile for an (n+1)th puff based on a time interval between an n-th puff and the (n+1)th puff of a user and may control power to be supplied to the heater 120 according to the determined power profile during the (n+1)th puff. Herein, "n" is a natural number.

The controller 160 may determine a time interval between user's puffs based on a start time of the puff of the user and an end time of the puff of the user. According to an embodiment, the controller 160 may determine a period of time from the end time of the n-th puff of the user to the start time of the (n+1)th puff of the user, as a time interval between the n-th puff of the user and (n+1)th puff of the user. According to another embodiment, the controller 160 may determine a period of time from the time when a predetermined time elapses from the start time of the n-th puff of the user to the start time of the (n+1)th puff of the user as a time interval between the n-th puff of the user and the (n+1)th puff of the user.

The power profile may indicate a change in power to be supplied to the heater 120 according to elapse of time. In addition, the power profile may include information on time when power is supplied to the heater 120, information on the amount of power supplied to the heater 120, information on a pulse width modulation (PWM) pulse signal for power to be supplied to the heater 120, and so on.

In an embodiment, the controller 160 may determine a power profile based on a comparison between consecutive time intervals. Specifically, in order to determine a power profile for the (n+2) puff, the controller 160 may compare a first time interval between an n-th puff and an (n+1)th puff, with a second time interval between the (n+1)th puff and an (n+2)th puff.

If the second time interval is longer than the first time interval, the controller 160 may determine a power profile for the (n+2)th puff such that higher power is supplied to the heater during the (n+2)th puff than during the (n+1)th puff.

On the other hand, if the second time interval is shorter than the first time interval, the controller 160 may determines a power profile for the (n+2)th puff such that lower power is provided to the heater during the (n+2)th puff than during the (n+1)th puff. For example, the controller 160 may control power supplied to the heater 120 according to a predetermined power profile that maintains a constant level of power during the (n+2)th puff.

In an embodiment, the controller 160 may determine a power profile by comparing a time interval between user's puffs with a predetermined reference time. Specifically, when a first time interval between an n-th puff and an (n+1)th puff is shorter than a first reference time, the controller 160 may determine a second power profile for the (n+1)th puff for supplying power lower than power of the first power profile for the n-th puff to the heater 120. In addition, when the first time interval between the n-th puff and the (n+1)th puff is longer than a second reference time, the controller 160 may determine the second power profile for the (n+1)th puff, which supplies power higher than the first power profile for the n-th puff to the heater 120.

When the time interval between the puffs of the user is shorter than a predetermined reference time, the controller 160 may control power to be supplied to the heater 120 according to a predetermined power profile. In an embodiment, when the first time interval between the n-th puff and the (n+1)th puff is shorter than a first reference time, the controller 160 may determine a power profile for the (n+1)th puff so that the heater 120 heats an aerosol generating material to a level at which no aerosol will be generated. In another embodiment, when the first time interval between the n-th puff and the (n+1)th puff is shorter than the first reference time, the controller 160 may determine the power profile for the (n+1)th puff so that the heater 120 heats an aerosol generating material to a level at which aerosol will not be carbonized. In another embodiment, when the first time interval between the n-th puff and the (n+1)th puff is shorter than the first reference time, the controller 160 may determine the power profile for the (n+1)th puff so that the power level of the first time interval is maintained. For example, when the first time interval between the n-th puff and the (n+1)th puff is shorter than 3 seconds, the controller 160 may determine the power profile for the (n+1)th puff so that power of 0.8 W is supplied to the heater 120 during the (n+1)th puff.

The controller 160 may determine a power profile corresponding to a time interval between user's puffs, based on information on a correspondence relationship between a puff time interval and the power profile. In addition, the controller 160 may select any one power profile from among a plurality of power profiles, based on the time interval between the puffs of the user.

Accordingly, the aerosol generating device 100 may determine a power profile based on a time interval between user's puffs and may control power to be supplied to the heater 120 according to the determined power profile. Thus, excessive variation in atomization amount may be reduced and heater may be prevented from being carbonized.

Specifically, if the time interval between the puffs of the user is short, power may be supplied to the heater 120 when a temperature of the heater 120 is still high from the previous puff. Thus, an atomization amount may be quite large, and the heater 120 may be easily carbonized. According to an embodiment, if the time interval between the puffs is short, the aerosol generating device 100 determines a power profile for supplying lower power to the heater 120. Thus, the atomization amount may be reduced and the heater 120 may be prevented from being carbonized.

On the other hand, if the time interval between the puffs of the user is long, power may be supplied to the heater 120 when the temperature of the heater 120 is greatly reduced after the previous puff. Thus, the atomization amount may be overly small. According to an embodiment, if the time interval between the puffs is long, the aerosol generating device 100 determines the power profile for supplying higher power to the heater 120, and thus, the atomization amount may be increased properly.

FIG. 5 illustrates that the aerosol generating device determines a power profile, according an embodiment.

Referring to FIG. 5, the aerosol generating device 100 may control power to be supplied to the heater 120 according to the A power profile during the n-th puff. Here, the A power profile may be determined based on a time interval between an (n−1)th puff and the n-th puff. Subsequently, the aerosol generating device 100 may determine the time interval between the n-th puff and the (n+1)th puff. For example, the aerosol generating device 100 may detect an end time of the n-th puff and a start time of the (n+1)th puff, using the sensor 130. Then, the aerosol generating device 100 may determine a period of time between the end time of the n-th puff and the start time of the (n+1)th puff as the time interval between the n-th puff and the (n+1)th puff.

The aerosol generating device 100 may select a B power profile for the (n+1)th puff based on the time interval between the n-th puff and the (n+1)th puff. Subsequently, the aerosol generating device 100 may control power to be supplied to the heater 120 according to the B power profile during the (n+1)th puff. For example, the aerosol generating device 100 may control the power to be supplied to the heater 120 according to the B power profile from the start time of the (n+1)th puff.

FIG. 6 illustrates information on a correspondence relationship between power profiles and time intervals between puffs.

The aerosol generating device 100 may store information 610 on a correspondence relationship between puff time intervals indicating time intervals between puffs, and the power profiles. For example, the memory 150 of the aerosol generating device 100 may store the information 610.

As illustrated in FIG. 6, the information 610 may include information on the power profile corresponding to the puff time interval. For example, the information 610 may include information on a first power profile 1 W corresponding to a puff time interval of 0 to 3 seconds, information on a second power profile 2 W corresponding to a puff time interval of 3 to 6 seconds, and information on a third power profile 4 W corresponding to a puff time interval of 6 to 9 seconds. For example, the first power profile 1 W may mean a power profile for supplying power of 1 W to the heater 120 for a predetermined time.

Accordingly, the aerosol generating device 100 may determine a power profile based on a time interval between user's puffs, according to the information 610. For example, when the time interval between the puffs of the user is 2 seconds, the aerosol generating device 100 may control power to be supplied to the heater 120 according to the first power profile. In addition, when the time interval between the puffs of the user is 4 seconds, the aerosol generating device 100 may control the power to be supplied to the heater 120 according to the second power profile.

Information on the first power profile to the third power profile described in FIG. 6 is only an example and the information on a correspondence relationship between puff time intervals and power profiles is not limited thereto. In other words, the first power profile to the third power profile may be set to supply powers other than 1 W, 2 W, and 4 W to the heater 120.

FIG. 7 illustrates a graph 710 showing a level of power supplied to a heater, according to an embodiment.

The aerosol generating device 100 may control the power to be supplied to the heater 120 according to the A power profile in an n-th puff period. For example, in the n-th puff period, the aerosol generating device 100 may control the power to be supplied to the heater 120 according to the A power profile by initially supplying power of 3 W to the heater 120 and gradually reducing the power in the n-th puff period.

Subsequently, the aerosol generating device 100 may supply a predetermined level of power to the heater 120 during a first time interval which is a time interval between the end time of the n-th puff period and the start time of the (n+1)th puff period. For example, the aerosol generating device 100 may supply power of 0.8 W to the heater 120 during the first time interval.

In addition, the aerosol generating device 100 may determine a power profile for the (n+1)th puff period based on the first time interval. For example, since the first time interval is longer than a predetermined first reference time, the aerosol generating device 100 may select the B power profile for the (n+1)th puff period. Subsequently, the aerosol generating device 100 may control the power to be supplied to the heater 120 according to the B power profile during the (n+1)th puff period such that higher power is supplied to the heater 120 during the (n+1)th than during the n-th puff. For example, the aerosol generating device 100 may control the power to be supplied to the heater 120 according to the B power profile by initially supplying power of 4 W to the heater 120 and reducing gradually the power in the (n+1)th puff period.

Likewise, the aerosol generating device 100 may supply the predetermined power to the heater 120 during the second time interval and may select the C power profile for an (n+2)th puff period based on the second time interval. For example, since the second time interval is shorter than a predetermined second reference time, the aerosol generating device 100 may select the C power profile for the (n+2)th puff period. Subsequently, the aerosol generating device 100 may control the power to be supplied to the heater 120 according to the C power profile in the (n+2)th puff period such that lower power is supplied to the heater 120 during the (n+2)th than during the (n+1)th puff. For example, the aerosol generating device 100 may control the power to be supplied to the heater 120 according to the C power profile by initially supplying power of 2 W to the heater 120 and reducing gradually the power in the (n+2)th puff period.

When the first time interval is shorter than a predetermined reference time, the aerosol generating device 100 may select a predetermined power profile for supplying lower power than the B power profile for the (n+1)th puff period. For example, when the first time interval is shorter than 3 seconds, the aerosol generating device 100 may maintain power of 0.8 W during the (n+1)th puff period.

Likewise, when the second time interval is shorter than a predetermined reference time, the aerosol generating device 100 may select a power profile for supplying lower power than the C power profile for the (n+2)th puff period. For example, when the second time interval is shorter than 2 seconds, the aerosol generating device 100 may continuously supply power of 1 W to the heater 120 during the (n+2)th puff period, according to the same power profile applied to the second time interval. Accordingly, when the time interval between the puffs is short, the aerosol generating device 100 may lower power supplied to the heater 120, and thus, the wick in the heater 120 may be prevented from being carbonized.

FIG. 8 is a flowchart illustrating a method of controlling power of an aerosol generating device.

The above description of the aerosol generating device 100 may be applied to the method of FIG. 8 although omitted below.

In step 810, the aerosol generating device 100 may determine a power profile based on a time interval between user's puffs. Specifically, the aerosol generating device 100 may determine the power profile for the (n+1)th puff based on the time interval between the n-th puff and (n+1)th puff of the user.

The aerosol generating device 100 may determine a time interval between the puffs of the user based on a start time of the puff of the user and an end time of the puff of the user.

The aerosol generating device 100 may determine the power profile by comparing the time interval between the puffs of the user with a predetermined time. When the time interval between the puffs of the user is shorter than a predetermined time, the aerosol generating device 100 may control power to be supplied to the heater 120 such that lower power is supplied to the heater in the next puff, compared to the previous puff.

The aerosol generating device 100 may determine a power profile corresponding to the time interval between the puffs of the user, based on information on a correspondence relationship between the power profile and the time interval between the puffs.

In step 820, the aerosol generating device 100 may control the power to be supplied to the heater according to the determined power profile. Specifically, the aerosol generating device 100 may determine the power profile for the (n+1)th puff based on a time interval between the n-th puff and (n+1)th puff of the user, and may control the power to be supplied to the heater according to the determined power profile during the (n+1)th puff.

Meanwhile, the above-described method may be implemented as a program executable on a computer and may be implemented by a general-purpose digital computer that executes the program by using a computer-readable recording medium. In addition, the structure of data used in the above-described method may be recorded in a computer-readable recording medium through various devices. The computer-readable recording medium includes a storage medium such as a magnetic storage medium (for example, ROM, RAM, USB, floppy disk, hard disk, and so on) and an optical read medium (for example, CD-ROM, DVD, and so on).

At least one of the components, elements, modules or units (collectively "components" in this paragraph) represented by a block in the drawings such as the controller 160, the user interface 140, and the sensor 130 in FIG. 4, may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:

a heater that is configured to heat an aerosol generating material;

a battery that is configured to supply power to the heater;

a sensor that is configured to sense puffs of aerosol; and a controller comprising at least one processor, the controller configured to determine a power profile based on a time interval between the puffs and controls power supplied to the heater according to the determined power profile, wherein the controller is configured to detect an end time of an n-th puff and a start time of an (n+1)th puff and determine a power profile for the (n+1)th puff based on a time interval between the start time and the end time, where n is a natural number.

2. The aerosol generating device of claim 1, wherein the controller is configured to:

compare a first time interval between an n-th puff and an (n+1)th puff, with a second time interval between the (n+1)th puff and an (n+2)th puff, and based on the second time interval being longer than the first time interval, determine a power profile for the (n+2)th puff such that higher power is supplied to the heater during the (n+2)th puff than during the (n+1)th puff, and based on the second time interval being shorter than the first time interval, determine the power profile for the (n+2)th puff such that lower power is provided to the heater during the (n+2)th puff than during the (n+1)th puff, where n is a natural number.

3. The aerosol generating device of claim 1, wherein the controller is configured to determine the power profile by comparing the time interval between the puffs with a predetermined reference time.

4. The aerosol generating device of claim 3, wherein based on a first time interval between an n-th puff and an (n+1)th puff being shorter than the predetermined reference time, the controller determines a power profile for the (n+1)th puff such that lower power is provided to the heater during the (n+1)th puff than during the n-th puff, where n is a natural number.

5. The aerosol generating device of claim 3, wherein based on a first time interval between an n-th puff and an (n+1)th puff being shorter than the predetermined reference time, the controller determines a power profile for the (n+1)th puff such that a predetermined level of power is maintained during the (n+1)th puff.

6. The aerosol generating device of claim 3, wherein based on a first time interval between an n-th puff and an (n+1)th puff being longer than the predetermined reference time, the controller determines a power profile for the (n+1)th puff such that higher power is provided to the heater during the (n+1)th puff than during the n-th puff, where n is a natural number.

7. The aerosol generating device of claim 1, further comprising a memory that stores information on a correspondence relationship between the time interval between the puffs and the power profile, wherein the controller is configured to determine the power profile based on the time interval between the puffs, according to the information.

8. The aerosol generating device of claim 1, wherein the aerosol generating material is a liquid composition.

9. A main body capable of being coupled to a cartridge including an aerosol generating material and a heater for heating the aerosol generating material, the main body comprising:

a battery that is configured to supply power to the heater;

a sensor that is configured to sense puffs of aerosol; and a controller comprising at least one processor, the controller configured to determine a power profile based on a time interval between the puffs and control power supplied to the heater according to the determined power profile, wherein the controller is configured to detect an end time of an n-th puff and a start time of an (n+1)th puff and determine a power profile for the (n+1)th puff based on a time interval between the start time and the end time, where n is a natural number.

10. A method of operating an aerosol generating device, comprising:

determining a power profile based on a time interval between puffs of aerosol; and controlling power supplied to a heater of the aerosol generating device according to the determined power profile, wherein the determining comprises detecting an end time of an n-th puff and a start time of an (n+1)th puff, and determining a power profile for the (n+1)th puff based on a time interval between the start time and the end time, where n is a natural number.

11. The method of claim 10, wherein the determining comprises comparing the time interval between the puffs with a predetermined reference time.

* * * * *